July 4, 1933. F. PIESCHKE 1,916,988
COLLAPSIBLE FLOWER DISPLAY
Filed Nov. 12, 1932
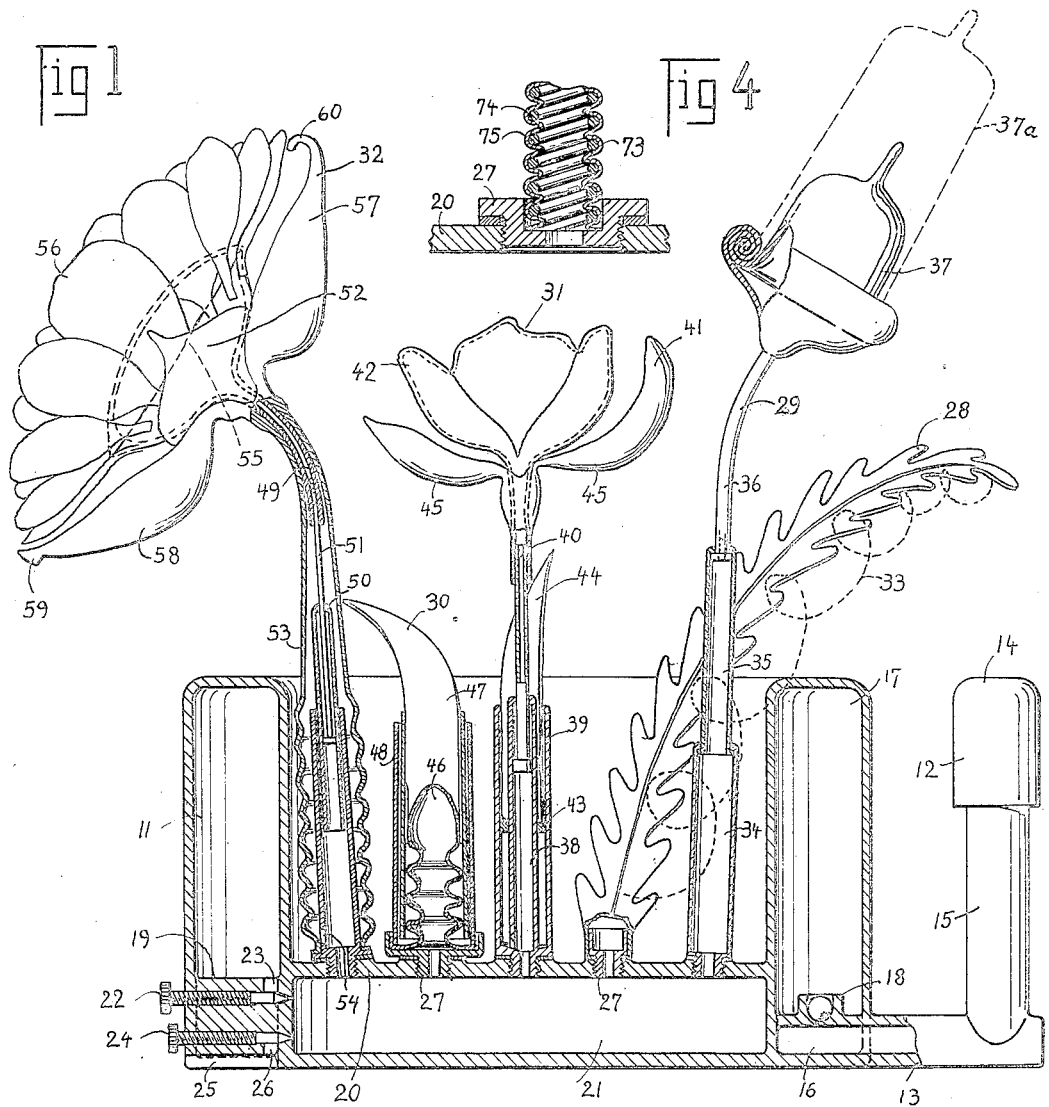
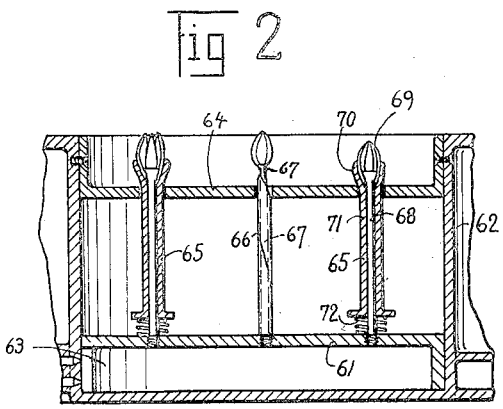
Fritz Pieschke
INVENTOR.
BY Rudolf Wildermann
ATTORNEYS.

Patented July 4, 1933

1,916,988

UNITED STATES PATENT OFFICE

FRITZ PIESCHKE, OF NEW YORK, N. Y.

COLLAPSIBLE FLOWER DISPLAY

Application filed November 12, 1932. Serial No. 642,385.

This invention relates to a collapsible flower display, a novelty which simulates the growth of plants.

The device of my invention is intended for educative and artistic effects, chronologically simulating the growth of plants in a limited time, whereas the growth of the real plant normally requires weeks and months, and the invention is particularly suited for advertising purposes, calling the attention of observers to other displays.

Like many educative and advertising devices, the device of my invention may of course also be used as a toy and serve for entertainment and amusement.

One of the objects of my invention is to have flowers, leaves or other plants grow out of a container, in which they originally are partly or wholly hidden. The leaves sprout and unroll and the stems of the flowers extend up in simulation of growth. The flowers open up, buds burst open and develop into full bloom.

The invention also provides a reversal of the procedure in which the flowers and plants collapse into a suitable container.

These and other objects of this invention will be more fully explained in the following specification and by the illustrations of the accompanying drawing in which Fig. 1 shows a large, partly sectioned elevation of a device of my invention.

Fig. 2 shows in a sectional detail view the sectioned elevation of a modification of my invention.

Fig. 3 shows a flower of my invention clasped in the closed position of a bud.

Fig. 4 shows a modified section of a collapsible stem.

Similar numerals refer to similar parts throughout the various views.

In Fig. 1 the container 11 simulates a flower pot provided laterally with gripping means 12. The gripping means are connected to the container 11 by a duct 13 extending from the base of the container to the bottom end of the gripping means. The gripping means 12 embodies a pump of the kind generally known as tire pumps and well known to those acquainted with the respective art. The said pump comprises a handle 14 which may be moved up and down, raising and lowering a piston (not shown) in the cylinder 15. By means of suitable valves of the conventional type (not shown) the air is taken into the cylinder 15 from the outside during the upward stroke of the piston and by the downward stroke of the piston the air is compressed into the duct 13.

The duct 13 closely extends at 16 into storage means for compressed air such as an annular enclosure 17, which forms the sides of the container 11. A poppet valve 18 issues from the duct 13 into the annular enclosure 17. The said valve allows the air compressed by the pump to enter upon the enclosure but does not permit egress of the air from the enclosure.

Upon the opposite side of the enclosure 17 I show a solid lug 19 extending across said enclosure near the bottom thereof. Above the said lug a false bottom 20 extends across the central space inside of said annular enclosure so that there is a compartment 21 inside the container near the bottom thereof. The said compartment 21 is connected by means of a needle valve 22 to the annular enclosure 17, so that the air compressed in the annular enclosure 17 may pass through an opening 23 past the point of the needle valve into the compartment 21 when the said needle valve is manipulated.

A similar needle valve 24, which is provided with a knurled head similar to that of needle valve 22, connects the compartment 21 to the outside by way of the hole 26 and the groove 25 extending along the bottom of the container from hole 26 to the outside of said container. The flow of compressed air from the annular enclosure 17 to the compartment 21, and the subsequent release of air from the compartment to the outside may therefore be readily adjusted and controlled by manipulation of needle valves 22 and 24.

Into a number of tapped holes extending through the false bottom 20 are inserted the threaded ends of plants, the said threaded ends closing air-tight in the manner of nipples,—or with the help of washers or gaskets,—against the said flat bottom. By means of such nipples 27 a number of plants are connected to the compartment 21, such plants being exemplarily illustrated in the drawing by a fern 28, a cat-tail 29, a leaf 30, and flowers 31 and 32.

The fern 28 is hollow and made of flexible material which has a natural tendency to roll into a spiral along a path indicated by a dotted line 33. When the fern 28 is inflated by air supplied to the compartment 21 it substantially extends in the manner indicated in Fig. 1. When it is deflated, for instance by opening the needle valve 24, it rolls onto itself until the coiled-up fern rests just above the false bottom 20.

The stalk of the cat-tail 29 comprises a number of hollow sections 34, 35 and 36, which are substantially air-tight but slidably telescoped into each other. When air is released from enclosure 17 through needle valve 22 into compartment 21, the said air will extend the parts 34, 35 and 36 from a collapsed position into the position shown in Fig. 1 and the hollow elastic spike 37, which connects to the section 36, will extend from the position shown into the position 37a, the rolled-up cylindrical wall of said spike being unrolled during the said operation.

In the flower 31, a stem 38 comprises an outer tube 39 and an inner tube 38, both of said tubes being affixed to,—and connecting to the compartment 21 through,—the respective nipple 27. A plurality of tubes may be telescopically collapsed into tube 38; one such tube 40 carries at its upper end a rubber tubing 41, with a small bulb 42 at its end. Between the tubes 38 and 39 an annular piston 43 is slidably arranged and a number of narrow leaves 44 are mounted upon the top side of said piston. The said piston rests, when the device is deflated, just above the nipple 27. When the flower is inflated, the piston 43 moves up and the leaves 44 are pushed out of tube 39, open up and possibly fall wholly or partly over the sides of said tube. At the same time the telescoped members of the stem are pushed out of each other by the air admitted thereto and the bulb 42 is blown up and assumes the shape shown in Fig. 2, the outer leaves 44 and 45 being resilient, so that they open up, from a state in which they were closed over the collapsed bulb 42, into the spread position 41.

The leaf 30 comprises a hollow lower member 46 and the single layer tip 47. The hollow lower member 46 is normally collapsed in bellow fashion above the nipple 27 to which it is connected and rests in the conical sheaths 48. The conical sheaths 48 loosely fit over each other, only the outmost sheath being rigidly connected with the nipple 27. When the lower part 46 of the leaf is inflated, it arises in the innermost sheath, pushing the part 47 out thereof until the lower part engages upon the inner upper end of said sheath. Then it pushes the said sheath up, until the lower end of said innermost sheath is engaged upon the top end of the next larger sheath.

The stem 49 of the flower 32 again comprises a plurality of telescoped tubes 50 and a rod 51 in the innermost tube the rod 51 carries at its upper end the flower proper 52. Over the collapsed tubes of the stem extends an elastic tubing 53, made for instance of rubber, which is collapsed in bellow fashion, so that it may be extended when air is admitted thereto through an opening 54 near the bottom thereof which extends into the nipple 27. The air entering into the tube 53 is also passed into the elastic bulb 55 of the flower 52, so that the said bulb is enlarged when inflated. At the widest part of bulb 55, a plurality of flower leaves 56 are attached around the margin thereof. Around this flower again extend outer leaves like 57 and 58, one of which 58 is provided with a button 59 at its end, whereas the other one 57, has the form of a hook 60 at its end. When the bulb 55 is collapsed, the outer leaves 57 and 58 may be closed thereover, and the hook 60 may be engaged upon button 59, so that the inside of the flower is hidden in said outer leaves. When the bulb 55 is inflated, the pressure of such inflation causes the hook 60 to disengage from button 59, so that the flower bursts apart and opens to the shape in which it is shown in Fig. 1.

It is of course understood that the inflation and deflation of the various parts of my invention may be brought about by various means, a small motor driven centrifugal pump for instance, or by the admission of water to the annular enclosure 11. It is also understood that the flowers may be opened mechanically instead of hydraulically. Furthermore, the whole false bottom 20 may be raised with the flowers attached thereto, either mechanically or hydraulically.

Such a modification is illustrated in Fig. 2. For the sake of convenience the raising and lowering of the false bottom 61 in the ring-like outer container 62 is shown to be brought about by air pressure applied in the bottom compartment 63 in the same manner in which it was applied in the compartment 20 of Fig. 1. But anybody versed in mechanics will understand that a slow working apparatus, a clock mechanism for instance, may also serve slowly to raise bottom 61.

Across the ring 63 extends near the top thereof a partition 64 which is perforated at various points, where the flowers, stalks and leaves slidably extend therethrough. The false bottom 61 slides up and down in the ring 62 in the manner of a piston. To the top of said bottom are attched the various plants, such as flowers 65 and leaves 66. The leaves 66 are rolled up upon themselves, or upon a rod 67 in the collapsed position. When the false bottom 61 is raised, the rod 67 with the longitudinally stiffened, flexible leaf 66 rolled thereon is pushed up through the respective opening in the partition 67, and the part of said leaf issuing above partition 64 unfolds.

The flowers 65 comprise a solid stem 68, to which are attached at its upper end the resilient flower leaves 69. The said leaves are held together in the bulb shaped upper end 70 of sleeve 71, which is pressed therearound by a spring 72 disposed on stem 68 between the false bottom 61 on a flange 73 provided on the lower end of sleeve 71.

In the position shown in Fig. 2 the flower leaves 69 are retained in the bowl 70 which may have the outer appearance of the outer leaves of a flower. When the false bottom or piston 61 is pushed up, the flower 65 is raised. When the flange 63 strikes the bottom of partition 64, its upward movement is intercepted; but since the false bottom 61 is raised further, the spring 72 is compressed, so that the stem 68 is pushed up in sleeve 71, and the flower leaves 69 are pushed out of the upper end of the bowl 70 and open up. When compartment 63 is deflated, false bottom 61 being slowly lowered, the leaves 69 are first pulled again into the bowl 70 by means of the spring 72, and then the sleeve 71 is lowered together with the other parts until finally the position of Fig. 2 is restored.

The modified hollow stem 73 shown in section in Fig. 4 is inserted in the corresponding counterbored bushing 27 and is closed at its upper end, by a bulb 42 or 52 for instance, so that it is elongated by inflation.

The stem 73 comprises a tension spring 74 and a flexible airtight tubing 75 extended thereover and partly between the convolutions of the spring.

Although I have shown and described one form of embodiment of my invention in detail, yet I do not wish to be limited thereby, except as the state of the art and the appended claims may require, for it is obvious that various modifications and changes may be made in the form of embodiment of my invention, without departing from the spirit and scope thereof.

What I claim is:—

1. In a display, a container, a plurality of artificial plants arranged side by side in said container, and means propelling said plants from said container in simulation of the natural growth of the simulated plants.

2. In a display, a container, an exsertile artificial plant in said container and spaced from the wall thereof, and means propelling said plant from said container in simulation of, but at a speed enhanced relatively to, the natural growth of the simulated plant.

3. In a display, a container, an exsertile stem in said container, a collapsed artificial flower on said stem and separated by said stem from said container, and means propelling said stem from said container and developing said collapsed flower in simulation of the natural growth of said artificial flower.

4. In a display, a container, a stem in said container, a collapsed artificial flower on said stem and separated by said stem from said container, and means propelling said stem from said container and inflating said collapsed flower in simulation of the natural growth of said artificial flower.

5. In a display, a container, a stem in said container, a collapsed artificial flower on said stem, and means extending said stem from said container and inflating said collapsed flower by way of said stem in simulation of the natural growth of said artificial flower.

6. In a display, a container, a stem in said container, a collapsed artificial flower carried by said stem and spaced thereby from said container, and means elongating said stem and thereby extending it from said container and inflating said collapsed flower in simulation of the natural growth of said artificial flower.

7. In a display, an inflatable flower, a hollow stem supporting said flower, means inflating said flower through said stem, and leaves extending over said flower, substantially closed over said flower when it is deflated, and pressed apart by the inflated flower.

8. In a display, an inflatable flower, a hollow stem supporting said flower, means inflating said flower through said stem, leaves extending over said flower, substantially closed over said flower when it is deflated and pressed apart by the inflated flower, and means disengageably locking some of said leaves over said flower when it is deflated.

9. In a display, a collapsible flower, a hollow stem supporting said flower, means opening up said flower by way of said stem, and leaves extending over said flower, substantially closed over said flower when it is collapsed, and releasing said flower when it is opened up.

10. In a display, an inflatable flower, a hollow stem supporting said flower, means inflating said flower through said stem, an elastic bulb comprised in said flower, flower leaves mounted on said bulb, and leaves extending over said flower, substantially closed over said flower when it is deflated, and pressed apart by the inflated flower.

11. In a display, an inflatable flower, a hollow stem supporting said flower, means inflating said flower through said stem, leaves extending over said flower, substantially closed over said flower when it is deflated, and pressed apart by the inflated flower, and means on some of said leaves overlappingly engaged upon each other when said leaves are closed over said flower and forced out of such engagement by inflation of the flower.

12. In a display, a compartment, inflatable flowers communicating with said compartment, a pressure fluid supply connected with said compartment, and adjustable means controlling the flow of said fluid from said supply to said compartment.

13. In a display, a compartment, inflatable flowers communicating with said compartment, a pressure fluid supply connected with said compartment, adjustable means controlling the flow of said fluid from said supply to said compartment, and a valve opening from said compartment and releasing the pressure of the fluid admitted thereto.

14. In a display, a compartment, inflatable flowers communicating with said compartment, a pressure fluid supply connected with said compartment, adjustable means controlling the flow of said fluid from said supply to said compartment, and a valve opening from said compartment to the outside.

15. In a display, a container, a false bottom raisably disposed in said container, artificial plants mounted in said container on said false bottom, and means raising said false bottom and thereby raising said plants substantially above said container.

16. In a display, a container, a perforated partition on top of said container, a false bottom raisably disposed in said container, artificial plants mounted in said container on said false bottom and extending through said partition, and means raising said false bottom and thereby raising said plants substantially above said container.

17. In a display, a container, a perforated partition on top of said container, a false bottom raisably disposed in said container, artificial plants mounted in said container on said false bottom and extending through said partition, means raising said false bottom and thereby raising said plants substantially above said container, said plants being contracted by said partition where extended therethrough and opening up above said partition after having been raised through the perforations thereof.

18. In a display, a container, a false bottom raisably disposed in said container, artificial flowers mounted in said container on said false bottom, means raising said false bottom and thereby raising said flowers substantially above said container, and means opening said flowers and actuated by the raising of said false bottom.

19. In a display, a container, a perforated partition on top of said container, a false bottom raisably disposed in said container, artificial flowers mounted in said container on said false bottom and extending through said partition, means raising said false bottom and thereby raising said flowers substantially above said container, and means opening said flowers and actuated by said partition when said bottom is raised.

20. In an artificial flower arising from a fixed level, an extendible stem, and means elongating and shortening said stem above said level at will.

21. In a display, a container, an exsertile artificial plant in said container, and guide means spacing said plant from the wall of said container.

22. In an artificial flower, an elongatable stem, means elongating said stem, and a tensile means contracting said stem and counteracting said elongating means.

In testimony whereof I affix my signature.

FRITZ PIESCHKE.